H. R. BARNHURST, H. R. COLLINS AND H. G. BARNHURST.
H. G. BARNHURST, ADMINISTRATOR OF H. R. BARNHURST, DEC'D.
BURNING PULVERIZED FUEL IN LOCOMOTIVES.
APPLICATION FILED SEPT. 22, 1919.
1,395,079.
Patented Oct. 25, 1921.
4 SHEETS—SHEET 3.
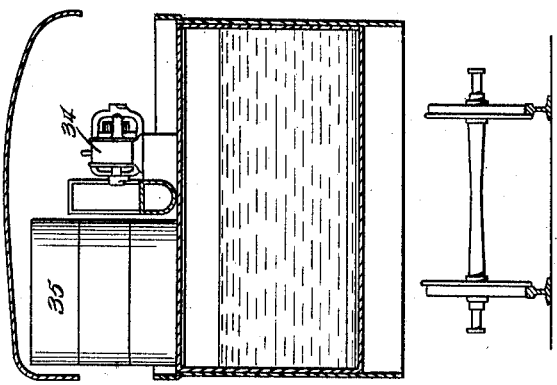
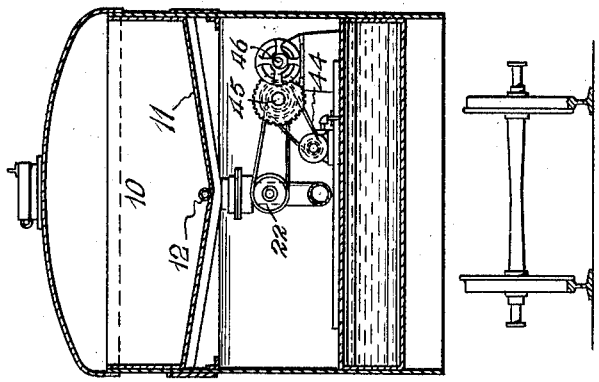
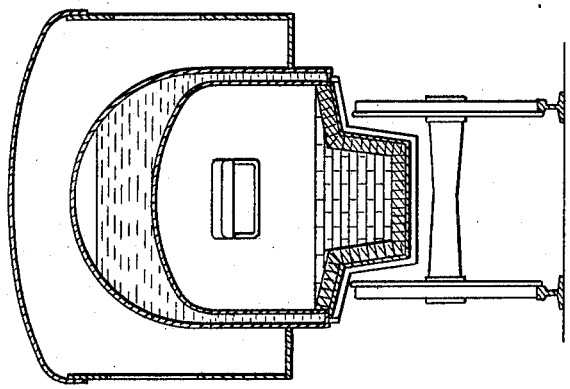

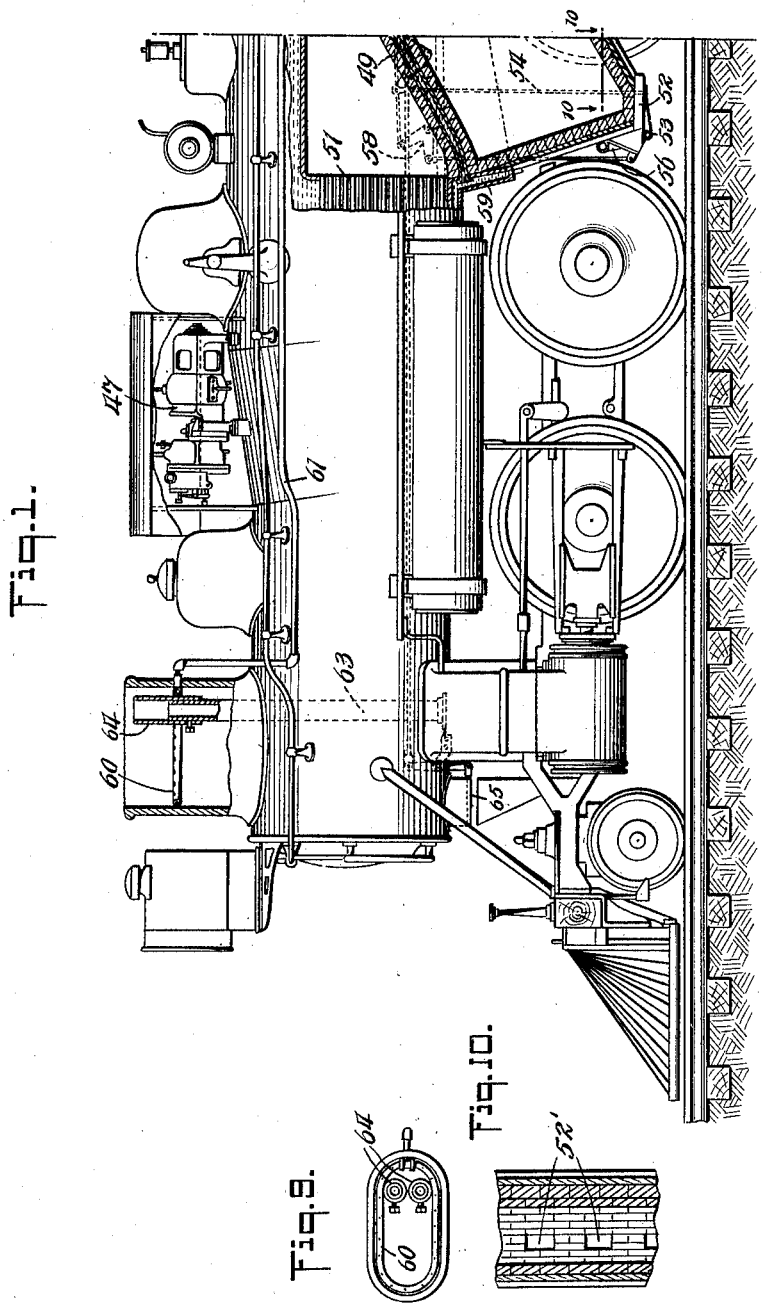

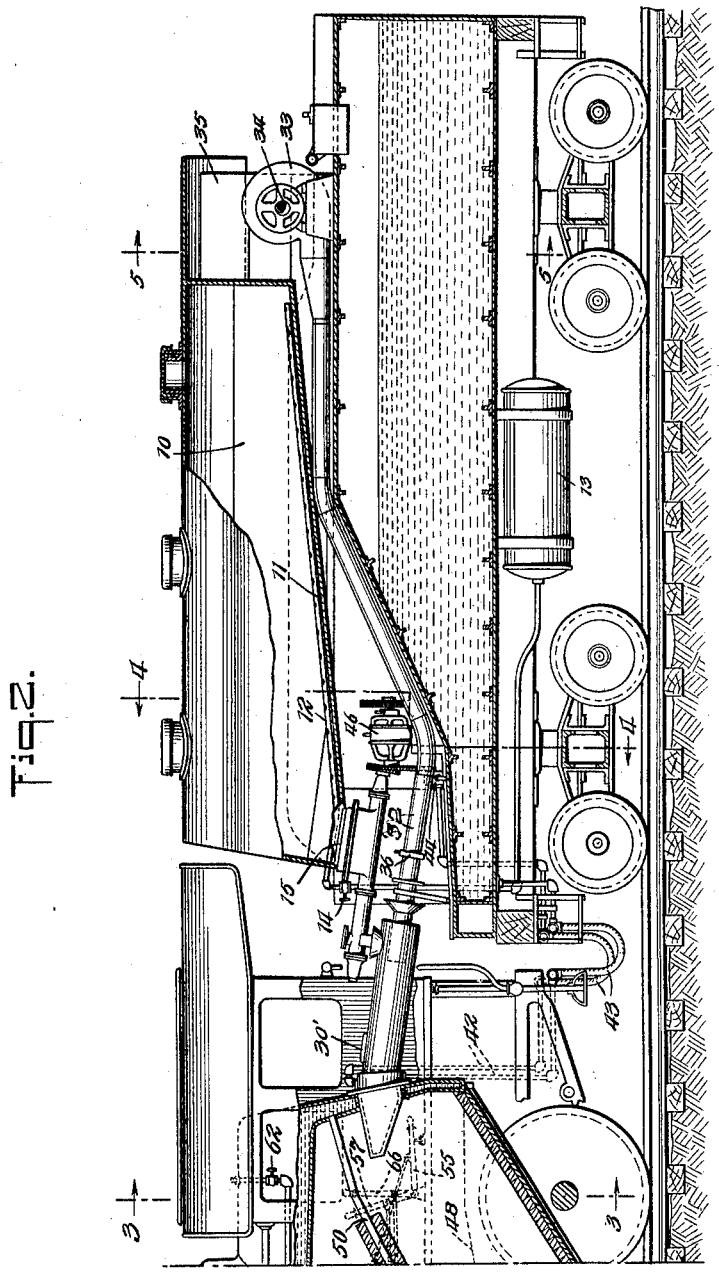

H. R. BARNHURST, H. R. COLLINS AND H. G. BARNHURST.
H. G. BARNHURST, ADMINISTRATOR OF H. R. BARNHURST, DEC'D.
BURNING PULVERIZED FUEL IN LOCOMOTIVES.
APPLICATION FILED SEPT. 22, 1919.
1,395,079.
Patented Oct. 25, 1921.
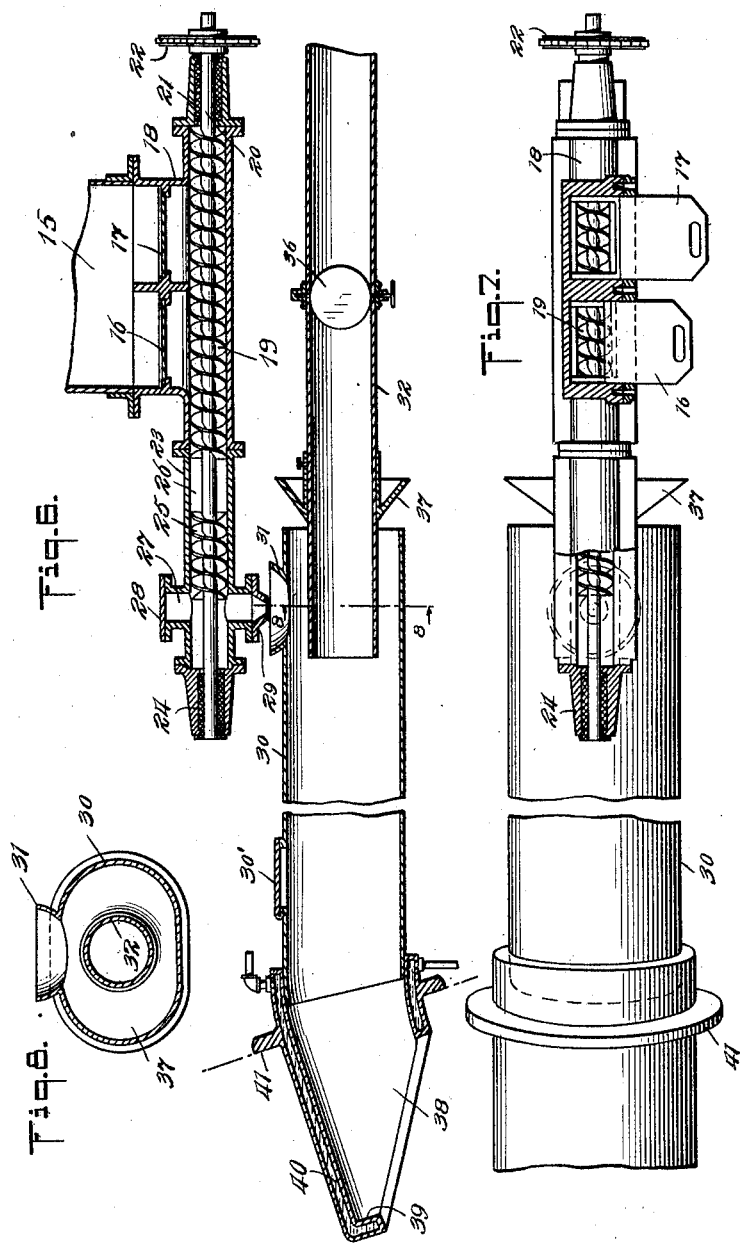

UNITED STATES PATENT OFFICE.

HENRY R. BARNHURST, DECEASED, LATE OF CATASAUQUA, PENNSYLVANIA, BY HENRY G. BARNHURST, ADMINISTRATOR, OF CATASAUQUA, PENNSYLVANIA, AND HARRY R. COLLINS, OF ALLENTOWN, AND HENRY G. BARNHURST, OF CATASAUQUA, PENNSYLVANIA, ASSIGNORS TO FULLER ENGINEERING COMPANY, OF ALLENTOWN, PENNSYLVANIA, A CORPORATION OF PENNSYLVANIA.

BURNING PULVERIZED FUEL IN LOCOMOTIVES.

1,395,079.   Specification of Letters Patent.   Patented Oct. 25, 1921.

Original application filed March 25, 1914, Serial No. 827,201. Divided and this application filed September 22, 1919. Serial No. 325,481.

*To all whom it may concern:*

Be it known that HENRY R. BARNHURST, deceased, late a citizen of the United States, residing at Catasauqua, county of Lehigh, and State of Pennsylvania, HARRY R. COLLINS and HENRY G. BARNHURST, citizens of the United States, residing, respectively, at Allentown and Catasauqua, county of Lehigh, and State of Pennsylvania, have invented certain new and useful Improvements in Burning Pulverized Fuel in Locomotives; and the following is a full, clear, and exact description of the invention, such as will enable others skilled in the art to which it appertains to make and use the same.

This invention relates to certain new and useful improvements in and relating to the utilization of pulverized fuel for the generation of steam in locomotive boilers. It embodies the adaptation to such uses, of the general mode of operation and the general principles of construction set forth in Letters Patent of the United States, No. 1,178,464, issued to Henry R. Barnhurst, on April 4, 1916, wherein an air-injection jet, supplied with a continuous current of air of relatively high velocity and pressure is supplied to the interior of a burner tube, under such conditions that it will entrain a large volume of secondary air current through the annular space between the burner pipe and the jet pipe, and will also entrain air through an orifice in the burner pipe in close proximity to the air jet, together with pulverized fuel which is simultaneously fed through said orifice; with the resultant effect that the primary high pressure air, the secondary air supply of large volume, and the fuel and air entrained through the orifice referred to shall unite in front of the jet tube and be projected into the furnace chamber or other space to be heated at a relatively low pressure and velocity, suitable for deflagration in the immediate vicinity of the entrance of the mixture into the combustion chamber.

The invention in the present application, which is a division of an application filed March 25, 1914, by Barnhurst, Collins & Barnhurst, Serial No. 827,201, on which Patent No. 1,383,371, was granted July 5, 1921, contemplates the adaptation of this general mode of combustion of pulverized fuel to locomotive uses, to which it is particularly adapted; although it will be understood that many of the individual features of adaptation are likewise applicable to pulverized fuel burners of an analogous type.

In using the apparatus hereinafter disclosed, the rate of combustion in the fire-box of the locomotive can be accurately controlled and for most efficient operation there is advantage in regulating the gas pressure in the smoke-box of the locomotive substantially independent of the pulsations of the cylinder exhaust and variable in proportion to the volume of the air and fuel being delivered into the fire-box, so that there may always be progressive movement of the products of combustion through the flues of the locomotive, but this movement will never be too fast for efficient steaming, nor so irregular as to interfere with complete combustion before the materials leave the hot zone of the fire-box.

In addition to regular and controllable movement of the hot products through the locomotive, the system here disclosed admits of complete control of the quantity of pulverized fuel delivered to the fire-box through the burner tube, and simultaneous control of the volume of air admitted with that fuel to insure its complete combustion. The coal can be conveniently carried on the locomotive tender and the high pressure air may be obtained from a blower conveniently located, and the connections between the burner tube on the locomotive and the coöperating elements carried by the tender are such that the tender may rock with respect to the locomotive as in going over rough trackage, without disturbing their operative relations or interfering with the regularity of delivery of the coal and air.

In the accompanying drawings,

Figures 1 and 2 show in elevation a locomotive and its tender, certain of the parts being in section to illustrate more clearly the relation of the several parts;

Fig. 3 is a cross section on the line 3—3 of Fig. 2, showing the rear end of the fire box;

Fig. 4 is a section on the line 4—4 of Fig. 2 looking toward the engine;

Fig. 5 is a section through the tender on the line 5—5 looking toward the rear of the tender;

Fig. 6 is a sectional elevation of the fuel feeding conveyer and of the burner pipe with its adjuncts;

Fig. 7 is a plan view of the same, partly in section;

Fig. 8 is a transverse section of the burner tube (Fig. 6) on the line 8—8;

Fig. 9 is a horizontal section through the smoke stack showing the two exhaust tubes whereby steam is led from the engine cylinders, and Fig. 10 is a view along the line 10—10, Fig. 1, showing the details of the ash door outlets.

The tender, which may carry many elements of the invention here disclosed, is in large part of standard construction, but it is surmounted by a coal bin 10 suitably attached and removable if desired, this bin being covered and provided with suitable openings through which the pulverized coal can be introduced. The bottom 11 of the coal bin preferably slopes toward the center, as shown in Fig. 4, and also slopes downward toward the front of the bin as shown in Fig. 2, and lying along the center of the sloping bottom is an air jet pipe 12 through which air may be forced from a suitable air tank 13 under control of a valve 14. The air tank 13 may be supplied with air under pressure from the air brake system, and it is the function of the air jets delivered by pipe 12 to liven the coal and facilitate its forward movement over the bottom of the coal bin.

Pulverized coal is made up of small particles, each having sharp facets and angles arising from the process of pulverization, and by vibration of the coal bin as the tender moves over the track these particles pack closely together with expulsion of the entrained air, and the particles seem to interlock in such manner as to interfere with free flow. However, by delivering air into the pile of coal as above described, the air pressure is sufficient to agitate the coal, and the air jets also have the function of introducing into the mass sufficient air to separate the particles and allow them to flow more freely to the point of discharge into the feed apparatus.

The feed apparatus comprises a hopper 15 from which the coal passes through a pair of gates 16 and 17 into a housing 18 wherein a screw conveyer 19 is suitably mounted. The shaft 20 of the screw conveyer is carried at its rear end in a bearing 21, and is equipped with a sprocket wheel 22, whereby it may be driven to advance the pulverized fuel admitted from the coal bin. At the front end of housing 18, and preferably removable therefrom for purposes of repair, is an auxiliary housing 23, at the forward end of which is a removable front bearing 24, wherein the shaft of the screw conveyer is held. An auxiliary conveyer 25 is mounted on this shaft, but is spaced from the front end of conveyer 19 far enough to form a substantial gap 26. The blades of conveyers 19 and 25 may be integral with the shaft 20, or may be suitably attached thereto and preferably they fit closely within their housings so that no pulverized fuel may be drawn by suction through the space allowed for clearance between the conveyers and their housings.

At the front end of the auxiliary housing 23 is a vertical passage 27 closed at the top by a cover plate 28 and at the bottom terminating in a removable fuel nozzle 29 through which the fuel is delivered for mixing with air in the burner tube.

With the arrangement above described, the delivery of the fuel is positive and under absolute control. As experience has shown, the ordinary means of feeding fuel from a stationary bin will not suffice where the whole apparatus, including the bin, is in a state of vibration, as on a locomotive, for there the vibrations and motions transmitted to the coal vary from time to time, in accordance with the speed and the condition of the track and are likely to produce irregularity in the quantity of coal delivered. This is particularly the case when there is any suction of air acting on the pulverized fuel. With the present arrangement, however, there is no chance that any suction at the fuel nozzle will cause a delivery of coal faster than is desirable, or will suck the coal forward along its spiral path faster than the conveyer is being turned, for the gap 26 between conveyer 19 and the auxiliary conveyer 25 interrupts the continuity of the spiral path and insures the formation of a plug or slug of packed coal between the two conveyers, beyond which no suction reaches. As the screw conveyer is rotated, this plug or dam of pulverized coal which fills the casing at the gap 26 is pushed bodily forward by further deliveries from conveyer 19, and is progressively taken up by conveyer 25, for positive and regulated delivery through the nozzle 29. There can be no flooding with fuel, irrespective of variations in the suction or in the vibratory conditions under which the apparatus is working.

The injector, whereby the pulverized fuel is delivered into the furnace of the locomotive, comprises a burner tube 30 preferably of oval cross-section, as indicated in Fig. 8, with a fuel receiving funnel 31 at its top, over which nozzle 29 is supported, and with respect to which said nozzle is freely movable, either vertically or horizontally. Burner tube 30 may be inclined upwardly, as shown in Fig. 2, to meet the exigencies of existing locomotive design, or can be placed horizontally if the fire-box opening is low enough and is entirely open at its rear end to receive an air supply pipe 32 carried by the tender. By upwardly tilting the burner tube as shown a certain protection is afforded against explosions in the fire-box, for if at any time the supply of air fails or drops below that necessary for proper propulsion of the fuel through the burner tube, the fuel will run out at the lower end of the burner tube and so warn the fireman of the trouble. If it were allowed to run into the hot fire-pot, unaccompanied by its proper complement of air, it might develop there a gaseous mixture of an explosive character. A hand opening 30' is provided in pipe 30 through which kindling may be introduced into the fire-box to start the fire.

The air supply pipe 32 is not mechanically connected with burner tube 30, but is free to shift in position with respect thereto, in accordance with the relative shifting of locomotive and tender as they move over the track. Air is supplied to the air pipe 32 from a suitable fan 33, preferably mounted at the rear of the tender under an overhanging canopy of the coal bin. An electric motor 34 supplied with current from storage batteries 35 is preferably used for driving this fan, and if desired the storage batteries may be connected in ordinary manner across a turbine generator carried on the top of the locomotive as hereinafter set forth. A gate 36 is provided in the air pipe, whereby the pressure and volume of air may be controlled, though usual controlling means may be applied to the motor 34 and its fan 33 to insure a positive and regulated delivery of air under relatively high pressure at the forward end of air pipe 32. Slidably mounted on air supply pipe 32 is a cone 37 which may be advanced toward the rear open end of the burner tube 30 to regulate the size of the air opening between the burner tube and the air pipe.

At the front end of burner tube 30, and of a size suitable for introduction into the ordinary stoking door of a locomotive is a burner nozzle 38 downwardlly inclined with respect to the burner tube, and preferably provided at its extreme forward end with a lip 39 for directing downwardly the incoming fuel and preventing its violent contact with opposite parts of the furnace wall. This burner nozzle can, with advantage, be a hollow casting with a water chamber 40 completely encircling the fuel passage and with a flange 41 overlapping the sides of the door opening to insure a relatively tight and constant connection. Water may be conveyed to this water chamber and circulated continuously therethrough by way of pipes 42 connected through flexible connections 43 with the water tank of the tender. Preferably, one of the water pipes projects into the bottom of the water tank, and the other leads to a motor driven pump 44, whereby a constant and regulated flow of water through the burner nozzle may be effected.

The means for driving the water pump includes a belt or similar connection to a jack shaft 45 (Fig. 4) which is suitably geared to a motor 46 mounted on the tender just above the front end of the water tank. This same jack shaft 45 may be connected to drive the sprocket wheel 22 of the coal feeding apparatus, as indicated in Fig. 4.

Electrical energy for driving motor 46 may be obtained from a turbine generator set 47 positioned on the top of the locomotive between the steam dome and the sand box, the connection being made through usual control apparatus. Preferably, the battery 35 at the rear of the tender is connected in as a part of this electrical system, so that it may be charged when the locomotive is under steam, and can be relied on for running the motors when the engine is cold and the fire is being kindled.

When the blower is in action, delivering air under high velocity through pipe 32 into the burner tube 30, there will be developed by the injector action a suction of air at funnel 31, so that pulverized fuel delivered from the fuel nozzle 29 will be caught by this downwardly moving air and mixed therewith. Also, air will be entrained through the rear open end of burner tube 30, the exact proportion depending somewhat on the position of the adjusting cone 37. The result is that the high velocity air supplied by pipe 32 becomes mixed with a larger volume of slowly moving air drawn in through the rear of tube 30 and through funnel 31, and with this entire quantity of air the pulverized fuel becomes intimately mixed as it is projected forward toward the delivery end of the fuel tube. By arranging the fuel nozzle above the air supply-pipe 32, and just in the rear of its delivery end, the pulverized fuel is at once started inwardly by air of high velocity and so is scattered throughout the entire cross section of the tube, and is started toward the burner nozzle at a speed sufficient to obviate any danger of clogging in the burner tube, even though the latter be upwardly inclined, as contemplated by this invention and as illustrated by Fig. 2. But when the fuel reaches the burner nozzle, it and the high velocity air which gave it impetus are so intimately mixed with the much larger volume of entrained air that the whole mixture comes out of the burner nozzle at slow velocity and in a most advantageous condition for delivery to a fire box.

By the arrangement disclosed, it is possible to use a small high pressure fan and yet obtain at the delivery end of the burner a large volume of low pressure air, and by suitably adjusting the sizes of the air supply pipe 32 and the burner tube 30, it is possible to obtain at the burner nozzle just the proper admixture of high velocity and low velocity air, and just the proper relation between pulverized fuel and total air. A definite knowledge of the quantity of air thus entering the furnace is exceedingly valuable in that it enables a quantity of fuel to be supplied which shall give a known temperature in the furnace when combined with the known quantity of air used for its projection.

The furnace of the locomotive may be of special construction to insure efficient combustion of the fuel. The furnace shown has a combustion chamber 48 in the form of a hopper, lined at its bottom and at its sides by fire brick to preserve the metal backing where the backing is not part of the water system of the boiler. The more important function of this fire brick is, however, to prevent the absorption of heat from the combustion chamber as far as possible so that perfect combustion of all the fuel may complete itself therein with high economy and the best conditions of combustion and with the minimum production of smoke.

The combustion chamber 48 is partly covered over below the fire-box crown sheet with an inclined arch 49 of fire brick supported by water tubes 50 through which water is continually passing, stimulated by the heated surroundings. The space between the arch and the crown sheet forms a wide flue and chamber leading to the boiler tubes, and intercepted only by the water cooled tubes 50 whereby the arch is supported.

The water cooled nozzle 38, through which the fuel and air enter the combustion chamber, delivers its fuel laden air current beneath the inclined arch 49 and directed downwardly toward the bottom of the combustion chamber, and from there the gaseous products return upward along the lower face of the arch and between the uncovered portions of the water tubes 50, and thus over the upper edge of the arch and ultimately into the tubes 51 of the boiler. Even though the fire brick of the arch may burn away partly, under the great heat of perfect combustion in chamber 48, the water protection of tubes 50 ultimately becomes effective in preventing further destruction. The gases produced by combustion in the combustion chamber will be approximately six to seven times the volume of the entering air, but this volume is reduced as the fire box and tubes in their uncovered portions absorb heat from these gases.

In order that accumulations of ash and slag may be disposed of, a trap door 52 is provided at the bottom of the hoppered combustion chamber 48. This door constitutes a closure for a gridwork made by omitting some of the bricks at the bottom corner of the hopper, as shown in plan view Fig. 10, and swings about the pivotal center 53 to uncover the openings 52' and allow the ashes and slag to drop out. The door is controlled by means of a rod 54 running to a bell crank which is actuated by means of a hand lever 55 in the cab of the locomotive. In the form of dust, the ash will blow away quickly by the motion of the train, but to facilitate its removal there is provided an air inlet just above the pivotal center 53 and normally closed by a door 56 which can be opened from the cab by means of a hand lever 57 acting through connecting rods and a bell crank 58. With the ash door 52 dropped down into open position, the opening of air door 56 will allow a current of air introduced by the movement of the train to sweep across the top face of the ash door, thereby sweeping away the ashes and slag and quickly clearing the bottom of the hoppered combustion chamber 48. These doors 52 and 56 also afford openings through which kindlings may be introduced to start a fire capable of igniting the fuel projected through the water cooled nozzle. The brick work of chamber 48 is supported from the member 59 and tubes 50. By sloping the walls of the combustion chamber downward and inward, as shown, the brick work is well braced against its metal back and is not dislodged by the vigorous shaking and vibration to which the locomotive is subjected while in service.

All gases formed in the fire-box pass through the tubes 51 of the locomotive where heat is absorbed from them and ultimately reach the smoke box at the front of the locomotive. The volume entering the smoke box in this way is in the neighborhood of twice the amount of air entering the fire-box. No spark arrester need be provided for no particle of fuel large enough to make a spark enters or emerges from the fire-box or tubes.

The arrangement of elements at the smoke stack departs from the standard practice in the following particulars. The smoke stack itself, while being of the usual width from side to side, is extended longitudinally of the locomotive into the oval outline illustrated by Fig. 9, and has a cross-section very much greater than that of the usual smoke stack. This oval outline gives the added area desired without obstructing the engineer's view of the track ahead. Within the smoke stack and at about the position indicated by Fig. 1 is a circular pipe 60 perforated around its top and supplied with steam through a pipe 61 controlled from the cab of the locomotive by means of a valve 62. Steam admitted to this perforated ring 60 can be used to create a steady upward draft through the smoke stack quite independent of the engine exhaust and of an intensity which can be regulated with nicety to correspond with the desired rate of combustion in the fire-box. This is of convenience at times in changing the rate of combustion in the fire-box.

The exhaust conduits 63 which leap upward from the engine cylinders are provided with telescoping ends 64 whereby their effective length may be adjusted. According to the preferred arrangement, the exhaust from the engine is carried so near the top of the smoke stack that it exerts but a moderate effect upon the draft through the fire-box, this arrangement being quite the reverse of the usual locomotive practice, for in accordance with that practice, the engine exhaust is relied on very largely to accelerate the passage of gases through the fire-box and the locomotive tubes. The exact adjustment of the telescoping ends 64 is arrived at by trial, but when their most advantageous position has once been located, they may be permanently bolted in position and need not be disturbed.

As a means for further controlling the draft conditions at the smoke stack, there is provided an air damper 65 at the bottom of the smoke box controlled from the cab by means of a hand lever 66 suitably connected.

The mode of operation of the construction above described is essentially as follows:

With the engine cold and the storage battery 35 suitably charged, kindling is introduced into chamber 48 either through the opening of the air door 56 or through the hand hole 30', and after the flame is hot enough the motor 34 is started and air from blower 33 is forcibly projected through air pipe 32 into burner tube 30. At the same time motor 46 is started and coal passing in regulated quantities through the adjustable gates 16 and 17 is transported by conveyers 19 and 25 and delivered through fuel nozzle 29 into the fuel receiving funnel 31 where it is caught by the entrained air and carried forward beyond the discharge end of the air supply 32 and there receives the impact of the rapidly moving air and is projected forward and upward through burner tube 30, while simultaneously being intimately commingled with the air entrained through the rear end of burner tube 30. When the fire is being started, the quantity of fuel and air supply may be carefully adjusted to prevent smothering the fire, and after the fire box and the entire locomotive once heats up to normal temperature, the proportions of air and fuel and their speed of movement through the locomotive are carefully adjusted to insure complete combustion of the fuel with a minimum of excess air and with such speed of movement through the locomotive tubes that a high rate of heat absorption will be insured.

In general, it is the object to maintain relatively stable conditions in the fire box, and relatively constant flow of the products of combustion from the smoke box, giving the coal ample time to burn completely before it comes in contact with the water cooled surfaces of the boiler.

Such disturbing action as the exhaust might have in the construction here described can be controlled by opening or closing the air door 65 at the bottom of the smoke box, for air thus admitted reduces the vacuum enforced by the exhaust. A moderate partial vacuum at the smoke box is necessary to the continuance of the current of gases through the boiler tubes 51.

Under the above conditions, it is essential that the volume of air passing out of the burner pipe shall be closely controlled, for upon its proportion to the fuel entrained and entering the furnace depends the maintenance of proper temperatures in the fire box. As the fuel travel after delivery to the burner pipe is very short, a low pressure can there be used without danger that the entrained coal will deposit in the pipe, and by locating the fuel inlet as above described with respect to the air feed pipe and the openings through which the large volume of additional air is entrained at low velocity, a complete commingling of the high and low velocity air and the pulverized fuel is insured, the high velocity air distributing its energy to the entire mass and moving that mass forward with a steady even flow into the combustion chamber.

As hereinbefore noted, the construction of the burner tube, the conveyer for supplying pulverized fuel thereto, and the high pressure pipe for entraining air through the annular space between the burner tube and the air-injector pipe and through the orifice which delivers the pulverized coal into the burner tube, constitute the sole invention of Henry R. Barnhurst, and, for that reason, is not claimed in the present case.

What is claimed is:

1. The method of utilizing pulverized fuel in the furnace of a boiler for supplying steam to a prime mover which consists in delivering the pulverized fuel to the furnace, supplying air to the furnace for combination with the pulverized fuel in combustion, exhausting the products of combustion from the furnace by utilizing for that purpose the exhaust steam from the prime mover and controlling the rate of feed of the fuel to the furnace, the rate of feed of air to the furnace and the rate at which the products of combustion are exhausted from the furnace, each independently of the other two.

2. The method of utilizing pulverized fuel in the furnace of a boiler for supplying steam to a prime mover which consists in delivering the pulverized fuel to the furnace, supplying air to the furnace for combination with the pulverized fuel in combustion, exhausting the products of combustion from the furnace by utilizing for that purpose the exhaust steam from the prime mover and controlling the rate of feed of the fuel to the furnace, the rate of feed of air to the furnace and the rate at which the products of combustion are exhausted from the furnace, each independently of the other two, the control of the rate at which the products of combustion are exhausted from the furnace being effected by regulating the admission of exterior air to the products of combustion.

3. The method of utilizing pulverized fuel in a locomotive which consists in delivering pulverized fuel to the fire-box of the locomotive, supplying air to the fire-box for combustion of the fuel, independently regulating the supply of the fuel and of the air to the fire-box, utilizing the exhaust from the cylinders of the locomotive to effect the flow of the gases of combustion from the fire-box through the boiler, and regulating the flow of the said gases of combustion by modifying the effect of the exhaust steam thereon.

4. The method of utilizing pulverized fuel in a locomotive which consists in delivering pulverized fuel to the fire-box of the locomotive, supplying air to the fire-box for combustion of the fuel, independently regulating the supply of the fuel and of the air to the fire-box, utilizing the exhaust from the cylinders of the locomotive to effect the flow of the gases of combustion from the fire-box through the boiler, and regulating the flow of the said gases of combustion by varying the rate of admission of exterior air into the stream of gases during their passage through the locomotive.

5. The method of burning pulverized fuel in a locomotive, which consists in projecting into the fire-box of the locomotive through the burner pipe a continuous jet of air at high pressure and velocity, feeding pulverized fuel into the burner tube near the high velocity jet, simultaneously entraining additional air through the rear of the burner tube for mixture with said fuel before its delivery to the fire-box, varying the amount of entrained air in accordance with the quantity of fuel being delivered to the fire-box and maintaining a partial vacuum in said fire-box and the smoke-flues leading therefrom by means of the exhaust from the cylinders of the locomotive, which partial vacuum is substantially independent of the pulsations of the exhaust and is sufficient to insure progressive movement of the products of combustion from the fire-box to the smoke-stack of the locomotive.

In testimony whereof we affix our signatures.

HENRY G. BARNHURST,
*Administrator of the estate of Henry R. Barnhurst, deceased.*

HARRY R. COLLINS.
HENRY G. BARNHURST.